(No Model.)
D. C. LANDON.
LOCKING DEVICE FOR SAWS.
No. 559,780.                    Patented May 5, 1896.
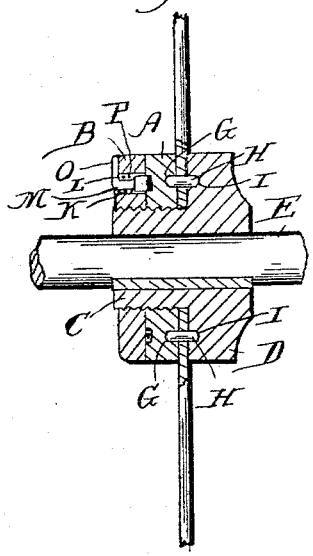
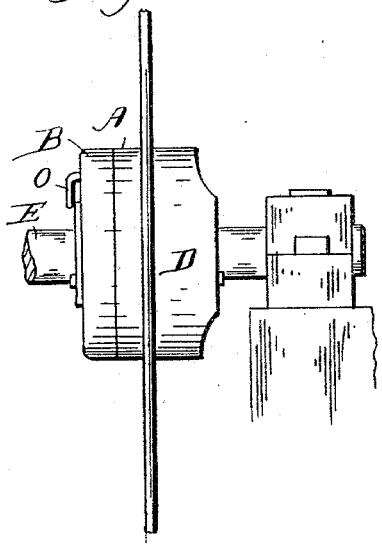
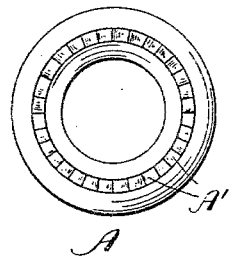
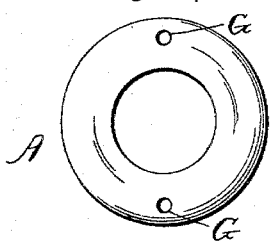
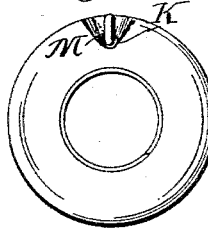
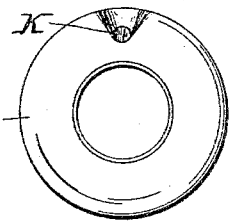
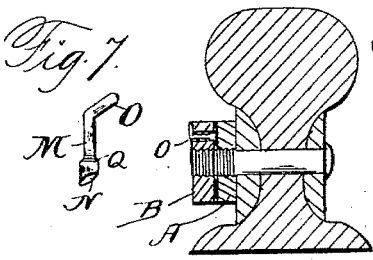
Witnesses:
H. K. Boulter
C. G. Northrup
Inventor:-
David C. Landon,
By William E. Boulter,
Attorney

UNITED STATES PATENT OFFICE.

DAVID C. LANDON, OF DUBUQUE, IOWA.

LOCKING DEVICE FOR SAWS.

SPECIFICATION forming part of Letters Patent No. 559,780, dated May 5, 1896.

Application filed June 12, 1894. Serial No. 514,318. (No model.)

*To all whom it may concern:*

Be it known that I, DAVID C. LANDON, a citizen of the United States, residing at Dubuque, in the county of Dubuque and State of Iowa, have invented certain new and useful Improvements in Locking Devices for Saws; and I do declare the following to be a full, clear, and exact description of the invention, such as will enable others skilled in the art to which it appertains to make and use the same.

My invention has relation to fastening or securing devices for circular saws, the same being also applicable for securing nuts upon their bolts in various classes of machinery, and among the objects in view is to provide an extremely simple, inexpensive, and efficient device whereby circular saws may be quickly and effectively secured upon their arbors and at the same time adapted to be readily removed for the purpose of permitting the same to be sharpened.

Other objects of my invention will be readily seen from the following description when taken in connection with the accompanying drawings, in which—

Figure 1 is a vertical sectional view showing my device as applied for securing a circular saw upon its arbor, the locking dog or pawl being in its unlocked position. Fig. 2 is an elevation of the parts shown in Fig. 1, the locking-dog being in its locked position. Fig. 3 is a face view of the ratcheted sleeve or collar. Fig. 4 is a reverse view thereof. Fig. 5 is a face view of the other collar or sleeve. Fig. 6 is a rear view thereof. Fig. 7 is a perspective view of the locking dog or pawl. Fig. 8 is a vertical sectional view showing my device as adapted for securing fish-plates of railway-rail joints.

My device consists, essentially, of two sections A B, one of which, as A, has a face ratcheted or toothed, while the other section, B, carries a spring-actuated pawl or dog adapted to engage with the ratchets of the section A.

In adapting my invention for use in securing circular saws upon their arbors the collar or sleeve A is provided with a central opening to adapt it to fit loosely over the threaded extension or shank C of the ordinary saw-collar D, keyed upon the saw-arbor E.

The collar A is provided in its face adjacent to the saw F with two diametrically opposite recesses or depressions G, adapted to receive two pins H, which pass through openings in the saw and firmly into recesses or depressions I in the saw-collar. By this means the collar A is prevented from rotating upon the extension of the saw-collar. The collar A is also provided upon its opposite face with suitable ratchet-teeth, as A'.

The section B of my device is provided with a threaded bore to adapt it to screw upon the threaded extension of the saw-collar, and it is also provided with an opening K, having a shoulder L, and within which opening is loosely mounted the locking dog or pawl M, which has its inner projecting end beveled or inclined, as at N, to adapt said end to ride over the ratchet-teeth of collar A when the section B is rotated in one direction, but to prevent said section B from rotating in the opposite direction.

The dog or pawl M is provided at its outer projecting end with a handle or cranked portion O, whereby to adapt it to be readily turned from its locked to its unlocked position, and vice versa.

For the purpose of locking the saw firmly in position the section or collar B is screwed tightly up against the collar A, the inclined end of the pawl riding over the teeth of collar A, and when the saw has been clamped sufficiently tight between the said collar and the enlarged portion of the collar D the pawl is, by means of its handle, turned from the unlocked position seen in Fig. 1 to a locked position, as seen in Fig. 2, whereby the vertical face of the pawl will be presented against the vertical face of the adjacent tooth to prevent rotation of the said collar B in the opposite direction.

In practice the outer face of the collar B may be recessed or countersunk, so as to receive the bent end or portion of the locking-dog when in a locked position, whereby when the latter is in such locked position it will not be accidentally turned, which would cause it to loosen and render it unfit for use.

It will be noted that it is necessary to screw the section B up against the collar A to cause the latter to tightly clamp the saw to prevent jarring or wearing loose of the said locking device; but the device may be securely locked in any position on the threads of certain classes of machinery where the same is a desirable object, being in that case very advantageous, inasmuch as in many instances more or less play of the parts is desirable.

In adapting the device for use in securing fish-plates in railway-rail joints and elsewhere the sections A and B, Fig. 5, are constructed very much similar to the parts as described hereinabove, the opening of collar A being in this instance threaded to adapt it to screw upon the bolt, and I also omit the openings G. The pawl M is constructed, arranged, and operates similarly to the corresponding part seen in Fig. 4, the inclined end riding over the ratchet-teeth and serving, when turned into the locked position before mentioned, to prevent backward rotation of the parts.

For the purpose of pressing the inner locking end of the pawl normally beyond the inner face of the section A, I employ a coiled spring P, which encircles the pawl and bears at its opposite ends upon the shoulder L and shoulder Q of the pawl.

My device is adapted to be readily operated, and when located in out-of-the-way or not readily-accessible places it will be found that the cranked end of the pawl can always be reached for operating the pawl to turn it from its unlocked to its locked position, and vice versa.

Although I have described my device as being adapted to secure saws upon their arbors and nuts upon bolts, it will be understood that other uses may be made of the device.

What I claim, and desire to secure by Letters Patent, is—

The combination with a saw-arbor, and a collar mounted rigidly thereon and having an exteriorly-threaded annular extension and pins secured to said collar, of a saw mounted on the arbor and having openings alining with the said pins and receiving the latter, a second collar loosely mounted on the said extension and having recesses into which said pins project, a series of ratchet-teeth on the opposite face of the latter collar, a third collar screwed upon the threaded extension of the first collar, a locking-pawl extending loosely through said third collar and having its inner end inclined and adapted to engage the said ratchet-teeth and the opposite end of the pawl being bent at an angle, said bent end being free of the third collar and serving as a means to turn the pawl, a shoulder on the third collar within the opening in which the pawl is located, a shoulder on the pawl, and a coiled spring encircling the pawl and bearing upon the said shoulders, for the purpose specified.

In testimony whereof I affix my signature in presence of two witnesses.

DAVID C. LANDON.

Witnesses:
ALEX. SIMPLOT,
JAMES PLAISTER.